United States Patent
Tsuchimoto et al.

[11] Patent Number: 5,939,221
[45] Date of Patent: Aug. 17, 1999

[54] METHOD OF RECOVERING NA FROM SODIUM-SULFUR CELLS

[75] Inventors: Tomonori Tsuchimoto, Gifu-prefecture; Yoshihiko Kurashima, Nagoya; Katsuichi Iwata, Ichimomiya, all of Japan

[73] Assignee: NGK Insulators, Ltd., Japan

[21] Appl. No.: 08/871,674

[22] Filed: Jun. 9, 1997

[30] Foreign Application Priority Data

Jun. 11, 1996 [JP] Japan ..................... 8-148792

[51] Int. Cl.⁶ .................................. H01M 10/54
[52] U.S. Cl. .............................. 429/49; 429/104
[58] Field of Search .................... 429/49, 104

[56] References Cited

U.S. PATENT DOCUMENTS

| | | | |
|---|---|---|---|
| 5,120,616 | 6/1992 | Bauer | 429/49 |
| 5,543,242 | 8/1996 | Tsuchimoto et al. | 429/49 |
| 5,578,389 | 11/1996 | Tsuchimoto et al. | 429/49 |
| 5,587,252 | 12/1996 | Tsuchimoto et al. | 429/49 |
| 5,600,879 | 2/1997 | Tsuchimoto et al. | 29/403.3 |
| 5,778,503 | 7/1998 | Tsuchimoto et al. | 29/33 |
| 5,785,732 | 7/1998 | Tsuchimoto et al. | 75/375 |

FOREIGN PATENT DOCUMENTS 8-500465  1/1996  Japan.

*Primary Examiner*—Maria Nuzzolillo
*Assistant Examiner*—Jennifer O'Malley
*Attorney, Agent, or Firm*—Parkhurst & Wendel, L.L.P

[57] ABSTRACT

After opening spent NaS cells, one or more NaS cells are loaded to and maintained in separator plates within a heating tank in such a way that the opening or openings thereof are oriented downwards. After no less than the time required to melt the Na and after Na has drained from the opening, the NaS cells from which Na has drained are removed from the separator plates within the heating tank and, in addition to this, a number of other opened NaS cells equal in number to those removed are loaded into and maintained in the empty spaces within the separator plates from which these NaS cells have been removed. In the recovery of Na, this method is efficient and time reducing and, furthermore, according to this method it is possible to make recovery facilities simpler and smaller.

2 Claims, 4 Drawing Sheets

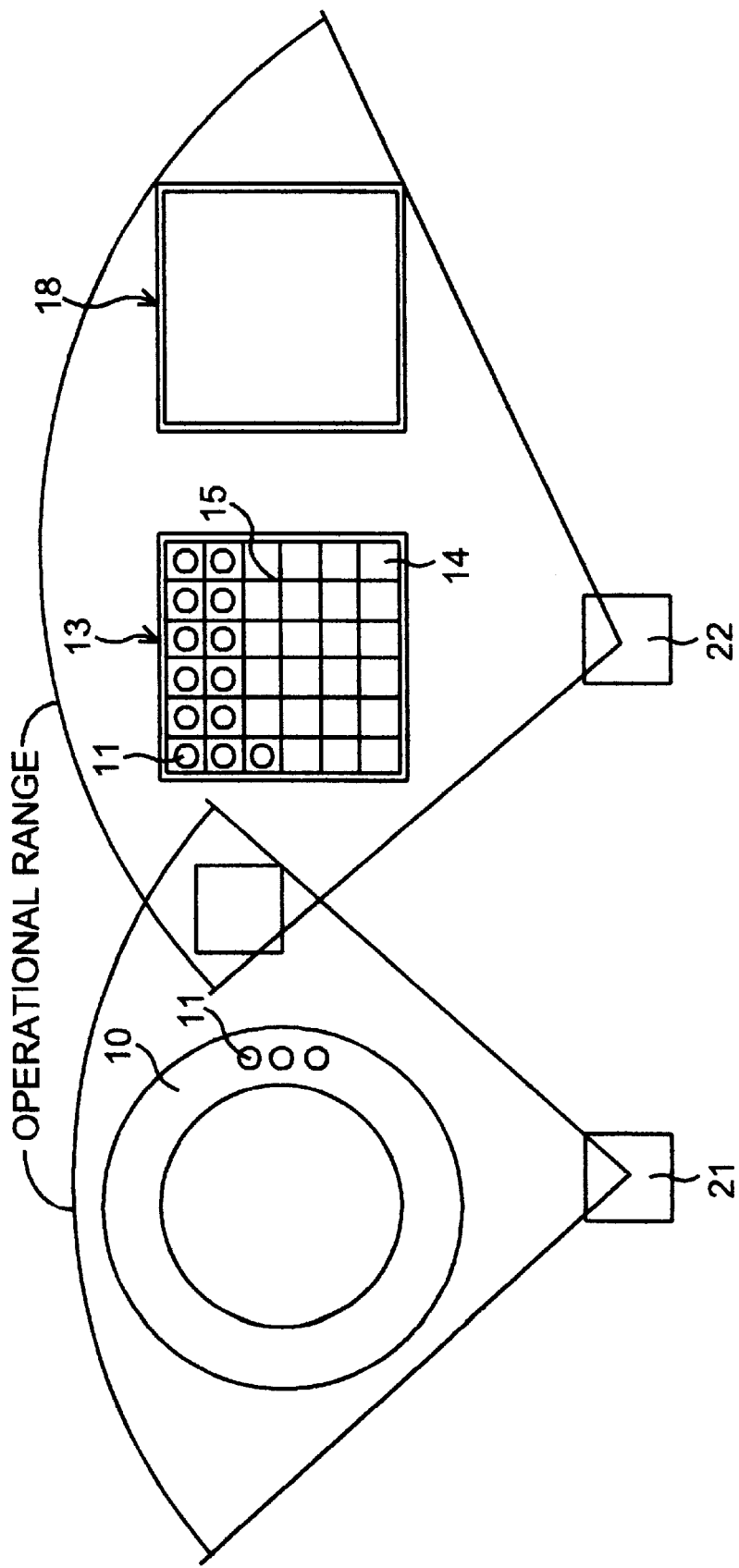

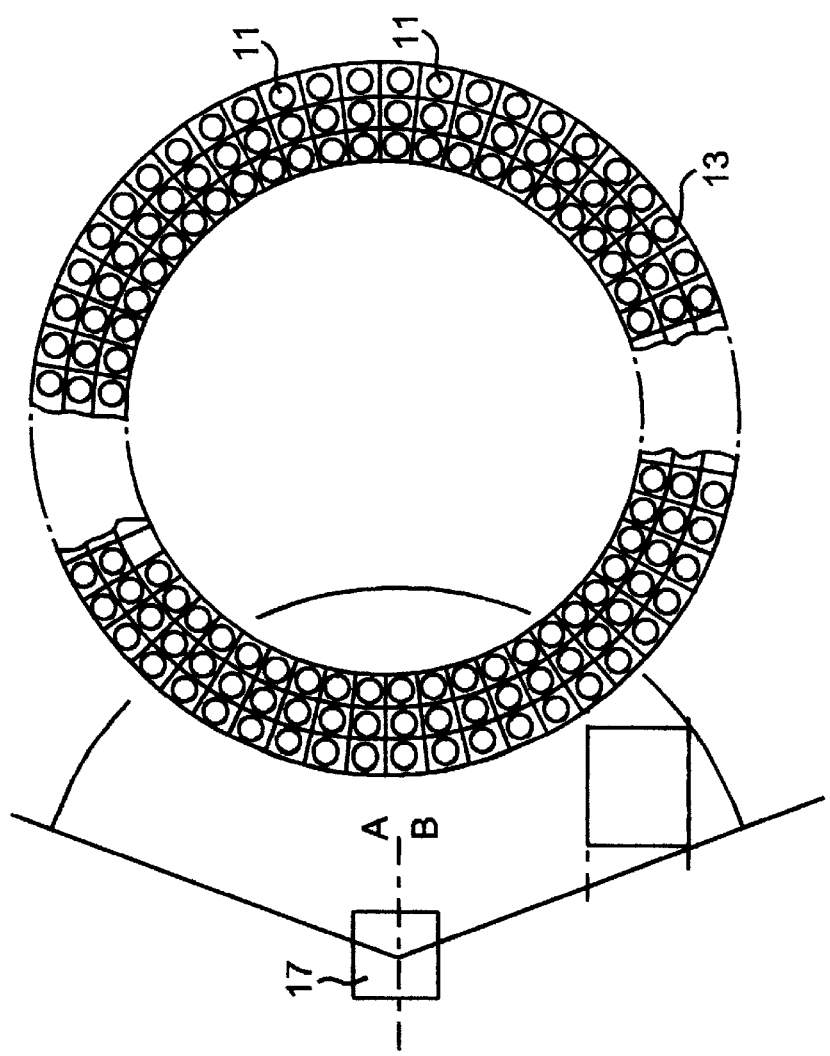
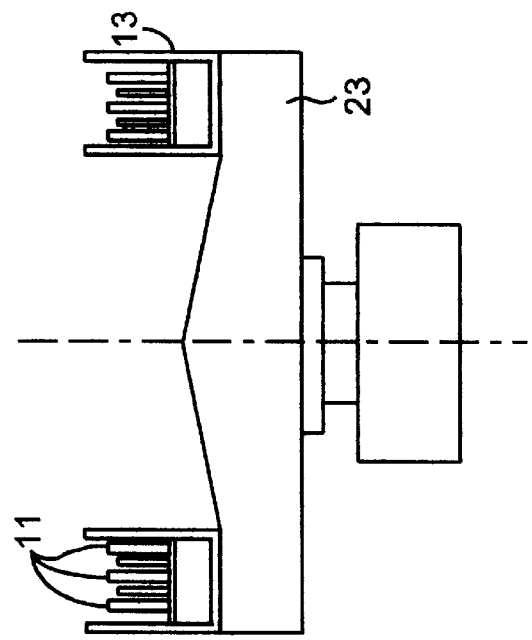

METHOD OF RECOVERING NA FROM SODIUM-SULFUR CELLS

BACKGROUND OF THE INVENTION AND RELATED ART

The present invention relates to a method of recovering sodium (Na) wherein sodium (Na) is recovered from spent sodium-sulfur cells (hereafter referred to as NaS cells).

NaS cells are charge and discharge capable secondary cells in which molten metallic sodium as an anode and molten sulfur as a cathode are arranged, the two are separated by β-alumina as a selective sodium-ion conductive solid electrolyte, and the cell is operated at a temperature of 300 to 350° C.

The structure of such NaS cells comprises a cylindrical anode container which contains the molten sulfur, a cartridge (inner cylinder) which contains the molten metallic sodium (Na), and a cylindrical solid electrolyte tube with a bottom, which contains the cartridge, and having the function of selectively conducting sodium ions ($Na^+$). The anode container and the solid electrolyte tube are joined by an insulating ring and a metal anode fitting. A metal cathode fitting is thermocompressively bonded to the upper surface of the insulating ring and a cathode cover is welded in place on this metal cathode fitting.

As NaS cells having a structure of this kind have the capacity of storing large amounts of electrical power, attention is given to them as electrical power storage cells. Accordingly, a trend towards future large scale production and use can be assumed and, as the life of these NaS cells is estimated at approximately 10 years, it can be assumed that a large volume of spent NaS cells, which must be disposed of, will be generated.

The disposal of these spent NaS cells without modification leads to such environmental problems as the generation of public hazards, and constitutes a waste of planetary resources, and it is therefore necessary for spent NaS cells to be recycled.

The present applicant has proposed a method of processing NaS cells and equipment for the same that is capable of automatically recovering the sodium from NaS cells and removing the inner cylinder (Japanese Patent Application Laid-open 6-333606).

According to this method for processing NaS cells and equipment for the same, several NaS cells, the openings of which had been opened, were loaded as one set into a work-set pipe unit. This arrangement of cells was maintained in the interior of a heated oil bath and, after sodium had drained away, the chuck claw of a pipe removing machine was introduced and, by means of chucking the NaS cell from the inside, the inner cylinder of the NaS cell action was removed. This was desirable in so much as it was possible to prevent contact between the sodium and air and to solve sodium evacuation problems resulting from oxidization of the sodium.

However, in the aforementioned method of processing NaS cells and equipment for the same, while it was possible to recover even the Na present outside the inner cylinder of the NaS cell as the result of removing this inner cylinder, and while both recovery ratios and safety were improved, the facilities required a large amount of space. Further, as this method and equipment use work-set containers, handling equipment for such activities as of work-set containers transport and return was required. In this respect also, the overall facilities were large and complicated.

Accordingly, the present invention has been attained in view of conventional problems noted above. It is an object of the present invention to provide a method which can selectively recover sodium alone and which makes possible large scale simplification of the overall facilities.

SUMMARY OF THE INVENTION

That is, in accordance with the present invention, there is provided a method of recovering Na from sodium-sulfur cells, comprising the steps of: opening spent sodium-sulfur cells; loading at least one of the sodium-sulfur cell into a retainer located within a heating tank in such a way that the opening or openings thereof are oriented downwards and maintained there; leaving the sodium-sulfur cell for a time not shorter than the time required to melt the sodium so as to allow the sodium to be drained; removing the sodium-sulfur cell from the retainer in said heating tank; and loading a number of other opened sodium-sulfur cells equal in number to those removed in the empty spaces in the retainer from which these sodium-sulfur cells have been removed.

According to the present invention, it is desirable that a chuck-transport equipment of parts, such as a palletizer robot etc., be used to chuck and transport one or more than one opened sodium-sulfur cell and load the same into a specific position or to specific positions in a retainer located within a heating tank where they are maintained, and that this equipment be used to remove sodium-sulfur cells from which the sodium has drained from the retainer within the heating tank.

BRIEF DESCRIPTION OF THE DRAWINGS

FIG. 3 is an explanatory view showing another example of equipment embodying a method of recovering Na according to the present invention.

FIG. 4(*a*) is a plan view of another example of a heating tank and

FIG. 4(*b*) is a sectional view of the same.

DESCRIPTION OF THE PREFERRED EMBODIMENTS

Figure 1:
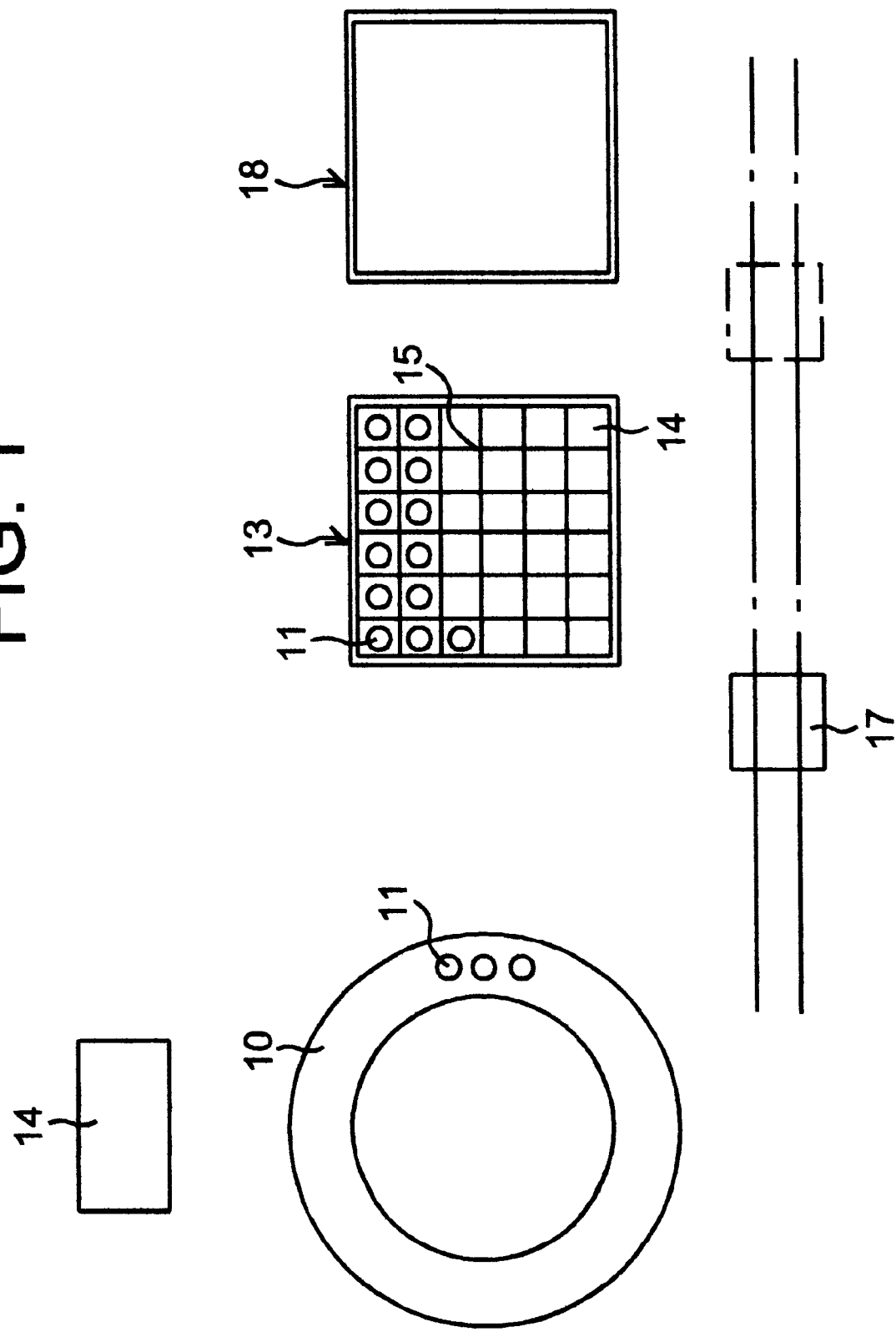
FIG. 1 is an explanatory view showing one example of equipment embodying a method of recovering Na according to the present invention.

In the present invention, holes are opened in the cathode cover and the cartridge of spent sodium-sulfur cells (NaS cells) and one or more than one of these NaS cells are loaded into a retainer within a heating tank so that the opening or openings thereof are oriented downwards. By maintaining the NaS cells within the heating tank in this condition for at least the time required for the sodium to melt, the molten sodium (Na) drains from the openings in the NaS cells. Next, at least one of the NaS cells from which sodium has drained is removed from the retainer within the heating tank and, at the same time, other opened sodium-sulfur cells equal in number to those removed are loaded into the spaces in the retainer within the heating tank which have been left vacant by the removal of these NaS cells and are maintained there.

In order to remove the NaS cells from the retainer, such suitable methods can be applied as, for example: a method wherein, using a palletizer robot etc. as stated hereinafter, the NaS cells are individually chucked; and a method wherein, using a palletizer robot etc. as stated hereinafter, cassettes into which several NaS cells have been loaded are chucked one cassette at a time.

As described above, a specific number of opened sodium-sulfur cells are systematically loaded into and maintained in specific locations within a heating tank and, after at least the time required for the sodium to melt, the aforementioned specific number of cells are systematically removed from the heating tank and, therefore, by means of application of conventional batch operations or continuous operations, the time requirements for and efficiency of Na recovery are improved and, in addition to this, the facilities are simplified and reduced in size.

Conventional approaches to Na recovery include either:

(a) methods wherein NaS cells are maintained in a heating tank for the time required to melt the Na while continuously moving them by means of a conveyer etc. or (b) methods wherein a large quantity of NaS cells are placed in a heating tank as a batch and maintained there for the time required to melt the Na, but in the present invention, a conceptualization divergent from the aforementioned methods is used, this being a "time difference" method of recovering Na wherein, in the chucking and transport of one or more than one NaS cell, during the required Na melting time for a NaS cell or group of NaS cells the chucking and transport of other NaS cell(s) or other group(s) of NaS cells are conducted.

In other words, the time required to chuck and transport one or more than one NaS cell is caused to be 1/n of the time required to melt the Na. Thus, if a number of NaS cells equal in number to a multiple of n are installed in the heating tank and operations are repeated wherein cells are systematically removed and other cells are systematically loaded into these locations, the next time cells are removed from these locations, they will have been maintained in the heating tank for the time required to melt the Na. Accordingly, the present method is such that, without moving the NaS cells within the heating tank, Na can be recovered while carrying out continuous transport operations.

A method of recovering Na according to the present invention will be described in detail hereunder with reference to one embodiment.

Figure 2:
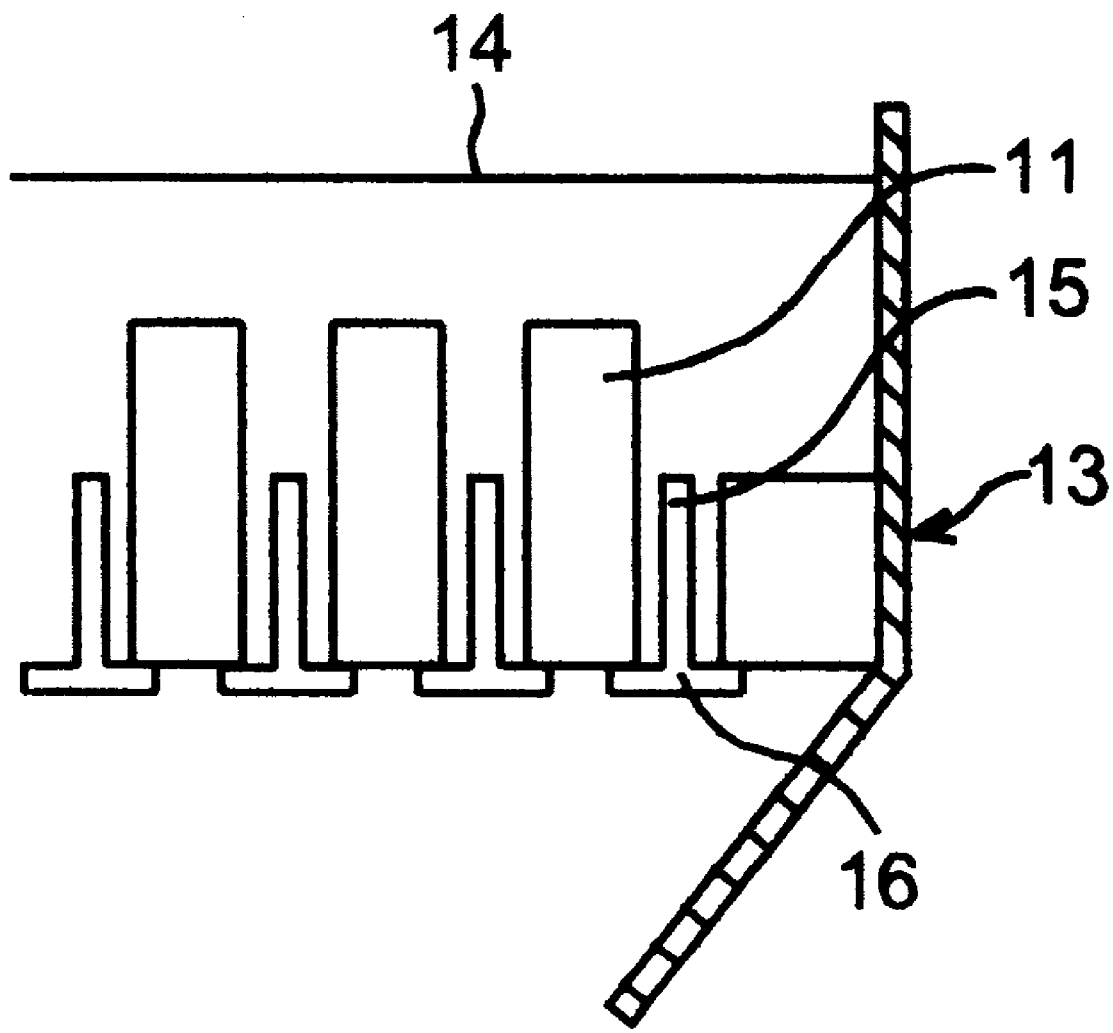
FIG. 2 is a fragmentary sectional view of one example of a heating tank.

FIG. 1 is an explanatery view showing one example of equipment embodying a method of recovering Na in accordance with the present invention. FIG. 2 is a fragmentary sectional view showing one example of a heating tank. In FIG. 1, 10 is a ring shaped oil tank mounted on a turntable. Oil tank 10 is charged with an oil such as molten paraffin etc. at normal temperatures. A ring shaped support (not illustrated in the figure) for NaS cells 11 is installed at the bottom of oil tank 10. 12 is an opening machine and, by means of intermittent rotation of the turntable, NaS cells 11 are moved, together with oil tank 10, to the opening position.

13 is a heating tank charged with heating oil 14 and, as shown in FIG. 2, NaS cells 11 are loaded into and maintained in a retainer comprising separator plates 15 which are installed within heating tank 13. The lower portions of separator plates 15 form seats 16, which support NaS cells 11.

First, a battery (module) comprising spent NaS cells which are to be disposed of is disassembled and broken down into individual NaS cells. Next, the individual NaS cells 11 which have been thus acquired are transferred to the interior of oil tank 10 and loaded into the supports therein. Next, NaS cells 11 which have been moved to the opening position by means of intermittent rotation of the turntable are opened by way of opening a hole in the cathode cover and the cartridge by means of opening machine 12. It is preferable for opening machine 12 to be fitted with a clamp to hold NaS cells 11 and a tool for opening holes, such as a hole saw, at its extremity.

Next, using palletizer robot 17 which comprises a chuck-transport equipment of parts, and after opening by means of opening machine 12 the cathode cover and the cartridge of one or more than one of NaS cell 11, the NaS cell or cells 11 are chucked, turned upside-down so that the openings thereof are oriented downwards, transported and loaded, and fitted and maintained in specific locations within separator plates 15 which are located within heating tank 13.

As shown in FIG. 3, processing time can be further reduced if temporary placement table 20 is located between opening machine 12 and heating tank 13, and if at least one opened NaS cell 11 is removed from oil tank 10, turned upside-down and placed on temporary placement table 20 by one robot 21 and, following this, another robot 22 transfers these from temporary placement table 20 to the interior of heating tank 13.

When NaS cells 11 are chucked and turned upside-down by palletizer robot 17, it is desirable that the opening be cleaned by means of brushing etc. and, following this, that such safety checks be carried out as checking for the presence of debris arising from cutting or scratches by means of a sensor etc. Further, the heating oil 14 with which heating tank 13 is charged should be maintained at a temperature of no less than approximately 115° C.

By means of maintaining NaS cells 11 within heating tank 13 in this condition for at least the time required to melt the sodium within NaS cells 11, the molten sodium (Na) drains through the openings of NaS cells 11.

Next, after checking NaS cells 11 from which the Na has drained, these NaS cells 11 are removed from separator plates 15 which are located within heating tank 13 using palletizer robot 17 and transferred to container 18 for purposes of disposal processing. Immediately following this transfer, using palletizer robot 17, a number of NaS cells 11 equal in number to those removed are chucked, transported to the same addresses (locations) in separator plates 15 within heating tank 13 from which the aforementioned NaS cells 11 have been removed, and loaded into and maintained in these positions.

As described above, a specific number of opened NaS cells 11 are systematically loaded to specific addresses (locations) within separator plates 15 which are installed within heating tank 13 and next, after these NaS cells 11 have been maintained in heating tank 13 for at least the time required to melt the Na, the aforementioned NaS cells 11 are removed from heating tank 13. Accordingly, as compared with conventional batch operation methods or continuous operation methods, the tank interior has a simple structure, the facility reliability is high and, furthermore, the recovery facilities are both simpler and smaller.

The present invention is not limited to the embodiment described above.

As shown in FIGS. 4(a) and 4(b), for example, a method is also possible wherein heating tank 13 has a ring shape and is mounted on turntable 23, and wherein opened NaS cells 11 are systematically placed in turntable-type heating tank 13 at fixed position A, turntable-type heating tank 13 rotates and NaS cells 11 from which the Na has drained are removed at fixed removal point B, or wherein a heating tank which has a free-curve shape is used, and opened NaS cells are chucked and transported by means of a palletizer robot. It is also possible to cause the turntable and the heating tank to move in synchronization with each other and to fix the NaS cell chucking position and the position in the heating tank to which the cells are transferred so that these are always the same, thereby making possible the use of an inexpensive type of robot for the chucking and transport of NaS cells, the robot performing simple operation.

As described above, the method according to the present invention is advantageous in so much as, in the recovery of Na, time requirements are further reduced, the method is efficient and, in addition, recovery facilities are both simpler and smaller.

What is claimed is:

1. A method of recovering Na from sodium-sulfur cells, comprising the steps of:

opening a first batch of spent sodium-sulfur cells;

loading said spent sodium-sulfur cells into a retainer located within a heating tank in such a way that the opening or openings of said cells are oriented downwards and maintained in that direction;

holding said spent sodium-sulfur cells for a time not shorter than the time required to melt the sodium in said spent sodium-sulfur cells so as to allow the sodium to be drained therefrom;

removing said sodium-sulfur cell from said retainer in said heating tank; and loading a second batch of opened spent sodium-sulfur cells in the empty spaces in said retainer from which said first batch of spent sodium-sulfur cells has been removed; wherein the opening and transporting of said second batch of sodium-sulfur cells to said retainer take place during the time required to malt the sodium of said first batch of spent sodium-sulfur cells; and the value of the number of cells that said retainer can hold divided by the number of spent sodium-sulfur cells in each batch; and the value of the time required to melt the sodium divided by the time required to open sodium-sulfur cells and transport sodium-sulfur cells to said retainer are identical, wherein said heating tank has a ring shape and is mounted on a turntable, opened spent sodium-sulfur cells are systematically placed in said heating tank at a designated position, said heating tank rotates, and the spent sodium-sulfur cells from which sodium has been drained are removed from a designated removal position.

2. The method of recovering Na from spent sodium-sulfur cells of claim 1, wherein by using chuck-transportation, a second batch of open spent sodium-sulfur cells is chucked, transported, loaded into, and maintained in said retainer within said heating tank, and the spent sodium-sulfur cells from the first batch of spent cells, from which sodium has been drained, are removed from said retainer within said heating tank.

* * * * *